United States Patent
Prizmant et al.

(10) Patent No.: US 12,248,569 B2
(45) Date of Patent: *Mar. 11, 2025

(54) PREVENTION OF CONTAINER ESCAPE-BASED ATTACKS OF A HOST SYSTEM

(71) Applicant: Palo Alto Networks, Inc., Santa Clara, CA (US)

(72) Inventors: Daniel Prizmant, Sunnyvale, CA (US); Ariel M. Zelivansky, Mountain View, CA (US); Liron Levin, Kefar Sava (IL); Eran Yanay, Modiin (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/621,511

(22) Filed: Mar. 29, 2024

(65) Prior Publication Data
US 2024/0241950 A1    Jul. 18, 2024

Related U.S. Application Data

(63) Continuation of application No. 17/651,198, filed on Feb. 15, 2022, now Pat. No. 11,983,268.

(51) Int. Cl.
G06F 21/55    (2013.01)
G06F 21/52    (2013.01)

(52) U.S. Cl.
CPC .......... G06F 21/554 (2013.01); G06F 21/52 (2013.01); *G06F 2221/034* (2013.01)

(58) Field of Classification Search
CPC .................. G06F 21/554; G06F 21/52
See application file for complete search history.

(56) References Cited

U.S. PATENT DOCUMENTS

| | | | |
|---|---|---|---|
| 11,983,268 B2 * | 5/2024 | Prizmant | G06F 9/45558 |
| 2018/0351968 A1 | 12/2018 | MacLeod et al. | |
| 2020/0410089 A1 | 12/2020 | Zhang et al. | |

(Continued)

OTHER PUBLICATIONS

EP Application No. 23156850.2, Extended European Search Report mailed Jul. 6, 2023, 8 pages.

(Continued)

*Primary Examiner* — Nicholas P Celani
(74) *Attorney, Agent, or Firm* — Gilliam IP PLLC

(57) ABSTRACT

A service prevents attacks carried out through container escape for silo-based containers. A callback is registered for a function(s) that may be invoked from inside a container and returns an object handle(s). The callback, when triggered by invocation of the function(s), executes for determination of whether requests for access to objects via their handles are issued by suspicious processes. Access to CExecSvc.exe is restricted for processes that request a handle for CExecSvc.exe and are determined to be associated with a container themselves. Processes that escape their container through a technique that evades detection are also blocked from accessing the host system. When a process requests access to an object via invocation of a function that returns a handle, the callback executes for determination of whether the process but not the requested object is associated with a container, in which case the service restricts the process' access to the host system.

20 Claims, 7 Drawing Sheets

(56) References Cited

U.S. PATENT DOCUMENTS

2022/0263835 A1     8/2022   Pieczul et al.
2023/0259615 A1     8/2023   Prizmant et al.

OTHER PUBLICATIONS

Forshaw, et al., "Project Zero: Who Contains the Containers?", [online] retrieved on Jan. 19, 2022 from <https://googleprojectzero.blogspot.com/2021/04/who-contains-containers.html>, Apr. 1, 2021, 10 pages.

Jian, et al., "A Defense Method against Docker Escape Attack", ICCSP '17: Proceedings of the 2017 International Conference on Cryptography, Security and Privacy, Mar. 2017, pp. 142-146.

Osborne, "Siloscape: this new malware targets Windows containers to access Kuernetes clusters", www.zdnet.com, Jun. 7, 2021.

Prizmant, et al., "Microsoft Patched the Issue With Windows Containers That Enabled Siloscape", unit42.paloaltonetworks.com, Aug. 5, 2021.

Prizmant, "Siloscape: First Known Malware Targeting Windows Containers to Compromise Cloud Environments", unit42.paloaltonetworks.com, Jun. 7, 2021.

Prizmant, et al., "What I Learned from Reverse Engineering Windows Containers", [online] retrieved on Dec. 17, 2021 from <https://unit42.paloaltonetworks.com/what-i-learned-from-reverse-engineering-windows-containers/>, Dec. 12, 2019, 12 pages.

Prizmant, "Windows Server Containers Are Open", [online] [retrieved on Jun. 20, 2023] Retrieved from the Internet: <https://unit42.paloaltonetworks.com/windows-server-containers-vulnerabilities/>, Jul. 15, 2020.

Prizmant, "Windows Server Containers Are Open, and Here's How You Can Break Out", [online] retrieved on Dec. 17, 2021 from <https://unit42.paloaltonetworks.com/windows-server-containers-vulnerabilities/>, Jul. 15, 2020, 11 pages.

Sultan, et al., "Container Security: Issues, Challenges, and the Road Ahead", in IEEE Access, vol. 7, pp. 52976-52996, 2019, doi: 10.1109/ACCESS.2019.2911732, Apr. 17, 2019, 21 pages.

\* cited by examiner

PREVENTION OF CONTAINER ESCAPE-BASED ATTACKS OF A HOST SYSTEM

BACKGROUND

The disclosure generally relates to digital data processing and to security arrangements for protecting computers, components thereof, programs or data against unauthorized activity.

Containerization is a common technique for packaging application program code in units referred to as containers. Containers are sometimes utilized as an alternative to virtual machines for virtualization and are increasingly leveraged for packaging applications to be deployed on cloud infrastructure. One aspect in which containerization differs from the virtualization provided by virtual machines is that containerized applications utilize the resources of the host operating system rather than a guest operating system as is included with virtual machines. Containers are thus lightweight and portable relative to virtual machines as a result of the lower overhead and consistent execution across host systems. With containers, executing program code of a container is isolated from the host operating system and resources as well as from other containers on the same host. Container escapes, sometimes referred to as container breakouts, occur when the isolation provided by a container is bypassed, thereby providing a containerized application with access to a host system and its resources.

BRIEF DESCRIPTION OF THE DRAWINGS

Aspects of the disclosure may be better understood by referencing the accompanying drawings.

DESCRIPTION

Figure 1:
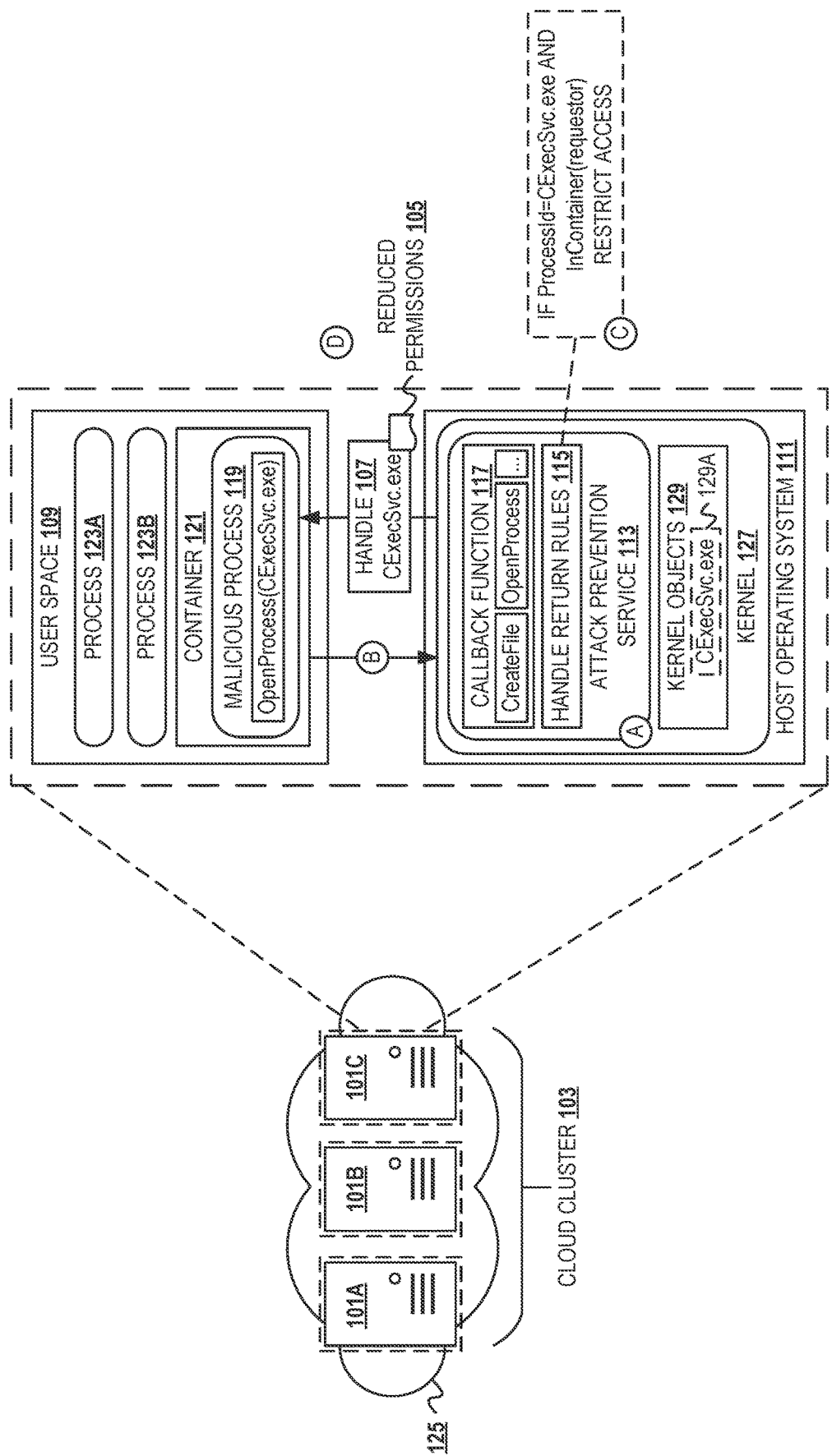
FIG. 1 is a conceptual diagram of preventing container escape for containers implemented with silo objects.

The description that follows includes example systems, methods, techniques, and program flows that embody aspects of the disclosure. However, it is understood that this disclosure may be practiced without these specific details. For instance, this disclosure refers to prevention of container escape-based attacks in a cloud cluster in illustrative examples. Aspects of this disclosure can be also applied to other environments in which a container runtime is available, such as a single physical or virtual host on which a container runtime is installed. In other instances, well-known instruction instances, protocols, structures and techniques have not been shown in detail in order not to obfuscate the description.

Terminology

This description uses shorthand terms related to cloud technology for efficiency and ease of explanation. When referring to "a cloud," this description is referring to the resources of a cloud service provider ("CSP"). For instance, a cloud can encompass the servers, virtual machines, and storage devices of a cloud service provider. In more general terms, a CSP resource accessible to customers is a resource owned/managed by the CSP entity that is accessible via network connections. Often, the access is in accordance with an application programming interface or software development kit provided by the cloud service provider.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

While containers originated as technique for packaging Linux® applications, Windows® containers have since been developed for packaging Windows applications. Two container architectures are available for Windows-based containers: a virtual machine deployment and a silo deployment. Silos, sometimes referred to as server silos, are kernel objects that allow for separation of kernel objects into logical units and are similar to Linux namespaces. Silo-based container deployments, however, are susceptible to attacks carried out through container escapes. Malicious code packaged in a Windows container via the silo deployment can leverage a container escape to bypass the isolation from the host system that is provided by the container and gain access to resources of the host system and potentially other host systems in a cloud cluster environment. The known technique by which such an attack can be carried out begins with a containerized, malicious application accessing a handle for the Windows process that manages container execution, CExecSvc.exe, which executes with highly permissive security permissions. The malicious application can then impersonate CExecSvc.exe to access the host system resources.

Disclosed herein are techniques implemented via a kernel driver, also referred to as a loadable kernel module or a kernel-mode driver, to prevent attacks carried out through container escapes from Windows silo-based containers (hereinafter simply "containers") at multiple stages. A callback is registered for one or more functions that return object handles and that may be invoked from inside a container so that evaluation of whether requests for handles are associated with benign processes by the service is triggered upon invocation of these functions. In a first stage of prevention of container escapes carried out through the known technique described above, the service described herein blocks suspicious processes from obtaining a handle for CExecSvc.exe. Suspicious processes are those that the service determines to be a child of CExecSvc.exe itself and thus are running in a container. A request for access to CExecSvc.exe that originates from a process running in a container is indicative that the process is attempting to impersonate CExecSvc.exe and therefore assume the increased privileges and access to the host system that it affords. The service detects and prevents fulfillment of such requests. To prevent fulfillment of these requests, the service may return to the suspicious process a handle for CExecSvc.exe with reduced permissions associated therewith that block the process from impersonating CExecSvc.exe and accessing the resources of the host system.

The service also prevents container escape-based attacks in which the container escape has been carried out with an unknown technique that evades detection. A second stage of container escape-based attack prevention is triggered when a process requests access to an object through invocation of a function that returns a handle for the requested object. The service determines if the requesting process is itself associated with a container and is also requesting access to an object that is outside the logical isolation provided by the container. Processes that are associated with a container and request access to the host system's objects, which are outside the logical isolation of the container, are treated as suspicious since detection of such processes is indicative that the container has already been escaped through an unknown technique other than impersonation of CExecSvc.exe. In this case, the service can prevent fulfillment of the request for access to the object. To prevent fulfillment of such requests, the service may return to the process a handle for the requested object that has a reduced set of permissions associated therewith that block the process from accessing the object. An attack on the host system thus cannot be executed after the container escape because the process is unable to access the host system's resources despite the container escape.

Example Illustrations

FIG. 1 is a conceptual diagram of preventing container escape for containers implemented with silo objects. A cloud cluster 103 comprises three nodes-nodes 101A, 101B, and 101C—that are provisioned for a cloud 125. The cloud 125 may be a virtual private cloud that provides a tenant with a private cloud environment within a public cloud offered by a CSP. The nodes 101A-C may be physical machines and/or virtual machines that provide resources for running containerized applications in the cloud 125, such as container runtimes installed thereon. The node 101C is depicted in additional detail in this example for simplicity, though aspects can apply to each node provisioned for a cloud.

The node 101C comprises a host operating system ("OS") 111 and a user space 109. The user space 109 comprises user space processes that execute on the node 101C, including an exemplary process 123A and a process 123B. A container 121 that is deployed to the node 101C also runs in the user space 109. The container 121 is a Windows-based container implemented with a silo object. The host OS 111 comprises a kernel 127 by which processes executing in the user space 109, including processes associated with the container 121, can access resources of the node 101C (e.g., objects stored in memory of the node 101C). While not depicted in FIG. 1, a subset of resources of the node 101C, such as a subset of kernel objects 129, are visible to the container 121 as a result of logical isolation of host resources achieved via containerization with Windows silo objects. The process(es) executing in the container 121, which comprises a malicious process 119 in this example, does not have unrestricted privileges for accessing the resources outside of the isolation from the host OS 111 and other processes in the user space 109 that the container 121 provides.

FIG. 1 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, a kernel driver comprising an attack prevention service ("service") 113 is loaded into the kernel 127. Loading the kernel driver by which the service 113 is implemented allows the service 113 to execute as part of the kernel 127. Upon load of the service 113 into the kernel 127, the service 113 registers a callback function 117. The callback function 117 is registered for one or more functions that can be invoked from the user space 109 and return handles by which user space processes can access the kernel objects 129 (e.g., files, events, pipes, etc.). The service 113 may specify these functions as a condition for execution of the callback function 117 so that invocation of a specified function triggers execution of the callback function 117 before execution of the invoked function. The service 113 may register the callback function 117 with this condition for invocation via the "ObRegisterCallbacks" routine that executes on load of the kernel driver into the kernel 127. FIG. 1 depicts the functions "CreateFile" and "OpenProcess" as exemplary functions that trigger invocation of the callback function 117, though the callback function 117 may be registered for different and/or additional functions that return handles for the kernel objects 129.

At stage B, a request to open an instance of the Windows container execution agent, CExecSvc.exe, issued by the malicious process 119 triggers the callback function 117. The malicious process 119 issues an "OpenProcess" call that designates the local instance of CExecSvc.exe, depicted in FIG. 1 as kernel object 129A, as the process to open. The "OpenProcess" function opens a process object and returns a handle for the process to the invoking process if successful. Since the callback function 117 was registered for "OpenProcess" invocations, the invocation of "OpenProcess" by the malicious process 119 satisfies the condition for execution of the callback function 117.

At stage C, the service 113 determines whether to return a handle for the kernel object 129A corresponding to CExecSvc.exe to the malicious process 119. The service 113 makes the determination based on rules 115 for returning handles to processes attempting to create, access, or otherwise manipulate the kernel objects 129. Each of the rules 115 can correspond to an individual function for which the callback function 117 was registered (e.g., a first rule for "CreateFile" invocations, a second rule for "OpenProcess" invocations, etc.) or may correspond to two or more functions (e.g., a single rule for "CreateFile" and "OpenProcess" invocations). An exemplary first of the rules 115 dictates that if a process requesting access to CExecSvc.exe is executing in a container itself, the process' access to CExecSvc.exe should be restricted. Identifying that a process executing in a container is attempting to access the local instance of CExecSvc.exe through its handle is an indicator that the process may be attempting to escape its container to gain access to resources of the host system, as legitimate processes executing in containers generally will not request access to the container execution agent. The service 113 thus determines whether the process that invoked "OpenProcess" is executing in a container and invoked "OpenProcess" for CExecSvc.exe.

The service 113 can determine whether the malicious process 119 invoked the "OpenProcess" function for CExecSvc.exe based on the parameter values that the malicious process 119 supplied when invoking the function (e.g., a value of a process identifier for CExecSvc.exe). The service 113 can determine whether the malicious process 119 is executing in a container based on determining whether the malicious process 119 is a child of CExecSvc.exe and is thus associated with a container implemented with a silo object. In this example, the service 113 determines that the malicious process 119 is executing in a container (i.e., the container 121) and is attempting to open the instance of CExecSvc.exe of the node 101C maintained as the kernel object 129A. The service 113 determines as a result that the invocation of "OpenProcess" satisfies the first of the rules 115 and access that the malicious process 119 has to the kernel object 129A should be restricted.

At stage D, the service 113 restricts access to the kernel object 129A that is permitted for the malicious process 119. CExecSvc.exe generally runs with highly permissive access permissions. However, since the service 113 identified that the malicious process 119 attempting to obtain the handle for the kernel object 129A was executing in the container 121, the service 113 restricts access to the kernel object 129A that is permitted for the malicious process 119 so the malicious process 119 cannot take advantage of these permissive access permissions. The service 113 may maintain indications of reduced permissions 105 that comprise least privilege or otherwise reduced permissions that should be assigned to the kernel object 129A for processes that are attempting illegitimate access as set out by the rules. The service reduces the access permissions to the kernel object 129A that will be provided via its handle 107 to the reduced permissions 105 (e.g., through invocation of a function(s) that reduces security permissions). The access to the kernel object 129A that the malicious process 119 is then permitted via its handle 107 will be dictated by the reduced permissions 105, which at least block the malicious process 119 from impersonation of CExecSvc.exe. This prevents the malicious process 119 from escaping the container 121 and accessing the resources of the node 101C, such as those of the kernel objects 129 that are outside of the logical isolation of the container 121. The malicious process 119 thus obtains the handle 107 from the kernel 127, which gives the appearance that the call was successful, but is unable to obtain the desired access to the kernel object 129A to carry out an attack on the node 101C or elsewhere in the cloud cluster 103.

Figure 2:
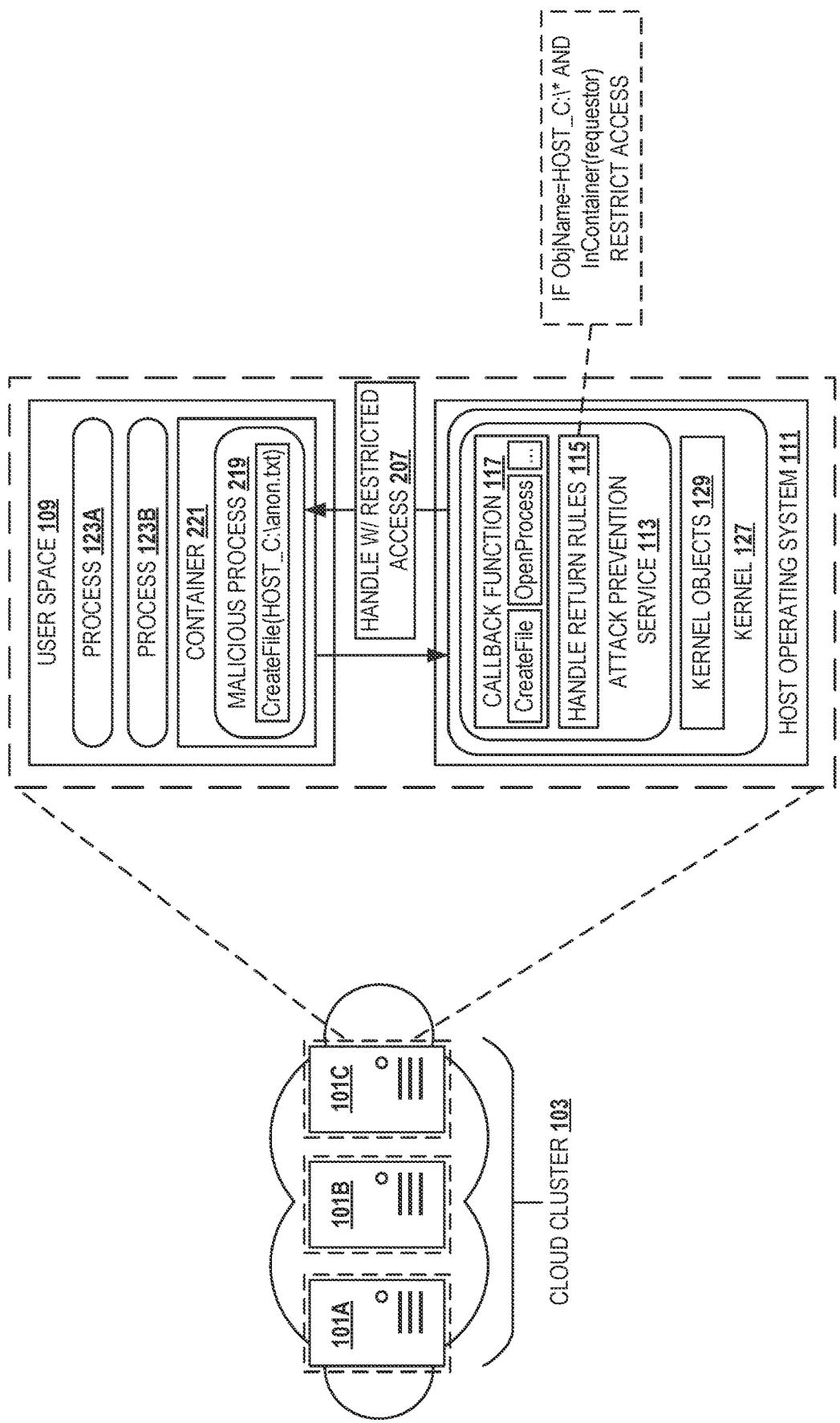
FIG. 2 is a conceptual diagram of preventing a process that has escaped from its container from attacking the host system.

FIG. 2 is a conceptual diagram of preventing a process that has escaped from its container from attacking the host system. While impersonation of CExecSvc.exe as described above is the known technique for container escapes, the service 113 can perform a later stage of attack prevention in the event that a process bypasses the isolation of its container through other, unknown means that evade detection. This stage of attack prevention is also performed after the kernel driver has been loaded into the kernel 127 and the callback function 117 has been registered as described in reference to FIG. 1. In this example, a malicious process 219 executes in a container 221 that has been deployed to the node 101C. Like the container 121, the container 221 is a Windows-based container implemented with a silo object. The malicious process 219 has bypassed the isolation provided by the container 221 through a technique other than CExecSvc.exe impersonation and is attempting to create a file on the host system through invocation of the "CreateFile" function. Invocation of "CreateFile" was indicated as a condition for execution of the callback function 117 as described in reference to FIG. 1 because "CreateFile" returns a handle for the created file if successful. As a result, the function invocation triggers the callback function 117.

The service 113 determines whether to return the handle for a file that the malicious process 219 has requested be created based on whether the request is indicative that the malicious process 219 is attempting illegitimate access to the host system (i.e., the node 101C) outside of the container 221. A process that is associated with a container but is attempting to access an object of the host system via a handle for the object is detected by the service 113 as likely attempting illegitimate host system access. The rules 115 further comprise a rule for restricting access to objects by processes attempting such access. FIG. 2 depicts an exemplary one of the rules 115 dictating that if the object corresponding to the handle to be returned to a process is an object of the host (e.g., by being stored under the host root directory) and the process is associated with a container, access to the object that is permitted for the process is restricted. The service 113 thus determines whether the process that invoked the "CreateFile" function is associated with a container and is attempting to create the file on the host system rather than in a container.

The service 113 can determine that the process that invoked "CreateFile" (i.e., the malicious process 219) is associated with a container based on calling a function exposed by the kernel 127 that returns an indication of such (e.g., "PsGetCurrentSilo"). To determine whether the object indicated in the invocation of "CreateFile" designates the host system, the service 113 can determine whether the root directory (i.e., the root directory object) of the object corresponds to the host. With containers implemented using silo objects, objects within the logical boundaries of a container will correspond to a root directory also created for that container. If the object has a root directory other than the host root directory, then the service 113 should determine that the object corresponds to a container instead of the host. Determination of the root directory can be made based on a path of the object provided to the invoked function as a parameter value. In this example, since the process that invoked "CreateFile" is executing in the container 221 and the file indicated in the function invocation is to be created under the host root directory, the service 113 determines that the malicious process 219 is attempting illegitimate access of the host system (i.e., the node 101C) and access to the host system should be restricted for the malicious process 219. Restricting access to the host system by processes such as the malicious process 219 includes restricting access to the host system, including the kernel objects 129, that is provided to a process by handles returned to the malicious process.

Since the creation of the new file on the host system attempted by the malicious process 219 corresponds to illegitimate host system access, the service 113 may restrict access to the host system by the malicious process 219 by preventing return of a handle to the malicious process 219 (e.g., by preventing execution of "CreateFile"). For instance, the rules 115 may further specify that processes attempting to create new objects in the host system's storage (e.g., new files or processes) should be blocked from obtaining a handle, such as through preventing execution of the invoked function that creates the object and returns a handle. Thus, instead of the kernel 127 returning a handle for the created file associated therewith, the service 113 may prevent the file creation call and/or return a handle 207 that is an "empty handle" that does not correspond to an object. The malicious process 219 thus obtains the handle 207 but is unable to utilize the handle 207 to carry out an attack on the node 101C or elsewhere in the cloud cluster 103.

FIGS. 3-6 are flowcharts of example operations for prevention of container escape-based attacks of a host system. The example operations are described with reference to an attack prevention service (hereinafter "the service") for consistency with the earlier figures. The service is referred to as executing as part of a kernel driver. Kernel drivers as described herein are also sometimes referred to as loadable kernel modules, kernel-mode drivers, or a similar term recognized in the art. The example operations are performed in reference to Windows containers implemented with silo objects, and the example operations refer to such containers as "containers" for simplicity. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 3:
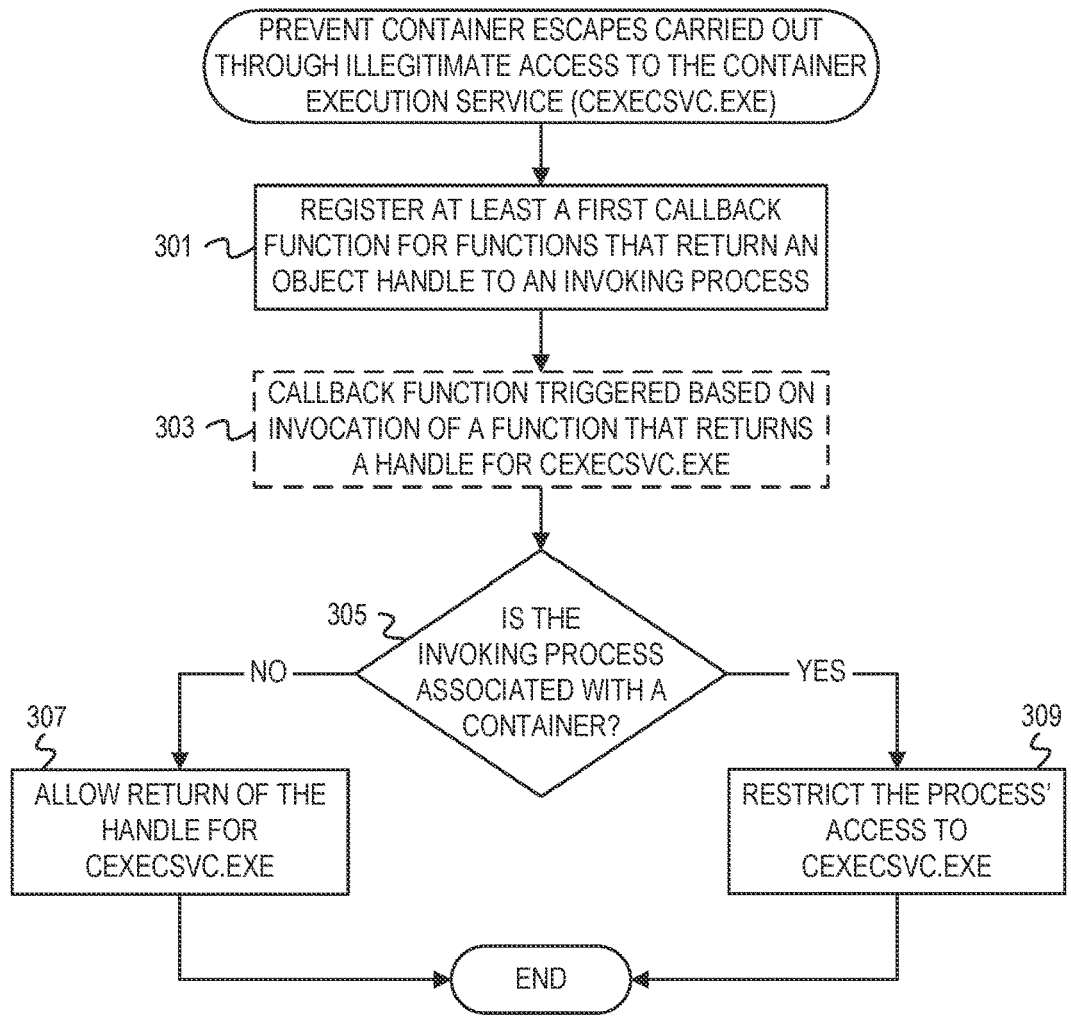
FIG. 3 is a flowchart of example operations for preventing container escapes carried out through illegitimate access to the container execution agent.

FIG. 3 is a flowchart of example operations for preventing container escapes carried out through illegitimate access to the container execution agent (CExecSvc.exe). The example operations are performed following load of a kernel driver that implements the service into the host system kernel.

At block 301, the service registers at least a first callback function for one or more functions that return an object handle to an invoking process. The service implements a callback function that can execute to determine whether to return a handle for an object to a process requesting access to the object based on evaluation of whether the process may be attempting illegitimate access of the host system. The service may register the callback function with invocation of one or more functions that return an object handle as a condition for its execution, and the service may register the callback function so that the callback function executes prior to the functions on which its execution is conditioned. To register the callback function with these conditions for its execution, the service may utilize the "ObRegisterCallbacks" function. The service may maintain a data structure that indicates each of the functions for which the callback function is to be registered that is provided with the invocation of "ObRegisterCallbacks" as a parameter value.

At block 303, the callback function is triggered based on a process invoking a function that returns a handle for CExecSvc.exe. Invocation of the callback function is triggered by a user space process invoking one of the functions for which the callback was registered to request access to CExecSvc.exe. An example of a function invocation that can trigger the callback function is an invocation of "OpenProcess" to open the local instance of CExecSvc.exe on the host system.

At block 305, the service determines if the invoking process is associated with a container. The invoking process can be determined to be associated with a container if the invoking process is itself a child of CExecSvc.exe (e.g., based on a process tree for the invoking process). As another example, the service can determine whether a thread corresponding to the invoking process is associated with a container. The service may do so by calling "PsGetCurrentSilo" or another available function that returns an indication of whether a thread or process is associated with a silo-based container. If the invoking process is not associated with a container, operations continue at block 307, where the service allows return of the handle for CExecSvc.exe (e.g., by allowing execution of the function invoked by the process that returns the handle). If the invoking process is associated with a container, operations continue at block 309.

At block 309, the service restricts the process' access to CExecSvc.exe. The service can restrict the process' access to CExecSvc.exe by reducing access permissions to CExecSvc.exe that are afforded by its handle. For instance, the service may maintain a set of least privilege or otherwise restricted security permissions (e.g., in a variable(s), in a data structure, etc.). To restrict the process' access to CExecSvc.exe, the service may update the access permissions for CExecSvc.exe that will be provided by its handle that the kernel will return to the process. The service may do so by calling a function(s) by which access permissions of kernel objects can be modified and specify the least privilege/restricted permissions that should be assigned to CExecSvc.exe for subsequent access via its handle. On receipt of the handle for CExecSvc.exe that is then returned by the kernel, the invoking process will be unable to manipulate CExecSvc.exe for malicious purposes since the handle allows the process the least privilege/restricted permissions for accessing CExecSvc.exe. As another example, the service may restrict the process' access to CExecSvc.exe by blocking the process' access to CExecSvc.exe, such as by blocking execution of the function invoked by the process that returns the handle for CExecSvc.exe.

Figure 4:
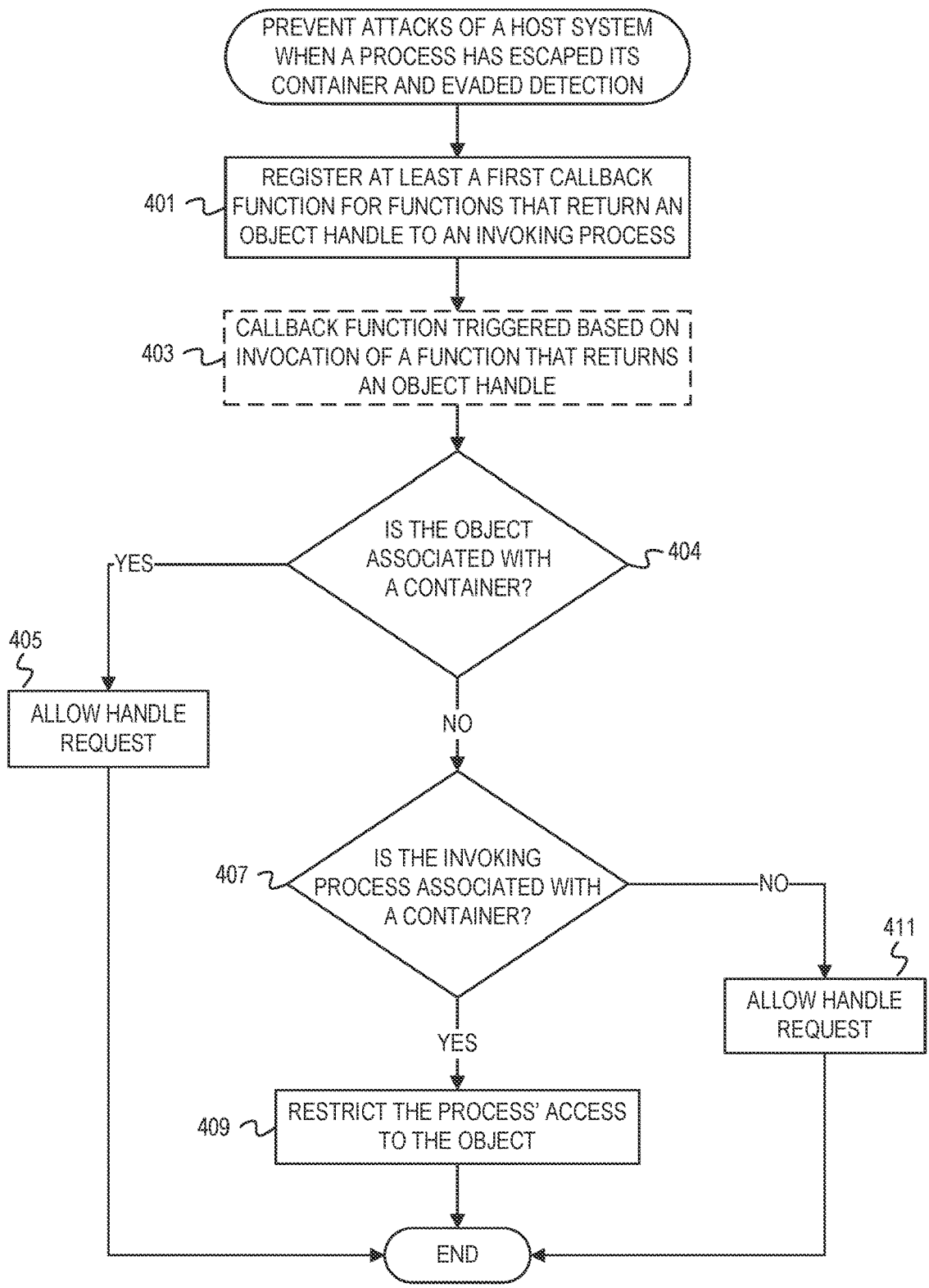
FIG. 4 is a flowchart of example operations for preventing container-escape based attacks when a process running in a container has gained access to the host system through unknown means that evade detection.

FIG. 4 is a flowchart of example operations for preventing container-escape based attacks when a process running in a container has gained access to the host system through unknown means that evade detection. As with FIG. 3, the example operations are performed following load of a kernel driver that implements the service into the host system kernel. The example operations can be performed after a process has bypassed its container using a technique that evaded detection as described in reference to FIG. 3 due to being new or otherwise unknown (i.e., a technique other than impersonation of CExecSvc.exe).

At block 401, the service registers at least a first callback function for one or more functions that return an object handle to an invoking process. Registration of the callback function can be performed as similarly described in reference to block 301 of FIG. 3. For instance, the service may register the callback function for one or more functions that return an object handle and are specified in a data structure via the "ObRegisterCallbacks" function so that the callback function executes prior to each function for which it is registered upon invocation of the function(s).

At block 403, the callback function is triggered based on a process invoking a function that returns a handle for an object. Invocation of the callback function is triggered by a user space process invoking one of the functions for which the callback was registered to request access to an object through its handle returned by the function. Examples of a function invocation that can trigger the callback function include a call to "CreateFile," a call to "OpenProcess" to open an instance of a process other than CExecSvc.exe, and a call to "CreateProcess."

At block 404, the service determines if the object is associated with a container. In Windows, each silo created for a container will also have a corresponding root directory object created. Silo containers thus will be associated with a root directory that is different from that of the host, and objects associated with silo containers will be under the root directory created for their respective silo. The service may determine if the object is associated with a container based on determining if the root directory for the object differs from the host system's root directory (e.g., based on a path associated with the object). If the object is under any root directory other than the host root directory, the object is determined to be associated with a container. If the object is associated with a container, operations continue at block 405, where the service allows the handle request (e.g., by returning to execution of the function invoked by the process). If the object is not associated with a container, operations continue at block 407.

At block 407, the service determines if the invoking process is associated with a container. In the context of Windows containers implemented with silo objects, if a process is running inside a container, the process will be associated with a silo object having a different root directory than the host. The service can thus determine whether the invoking process is associated with a container by determining whether the process is associated with a silo object. For instance, the service may determine whether the invoking process is a child of CExecSvc.exe, may call a function that returns an indication of whether a thread or process is associated with a silo-based container (e.g., "PsGetCurrentSilo"), etc. If the service identifies a silo object associated with the process, the process is determined to be associated with a container. If the process is associated with a container, operations continue at block 409. Otherwise, operations continue at block 411, where the service allows the handle request.

At block 411, the service restricts the process' access to the object. The service can restrict the process' access to the object by reducing access permissions to the object that are afforded by its handle (assuming the object is an existing kernel object). For instance, the service may maintain a set of least privilege or otherwise restricted security permissions (e.g., in a variable(s), in a data structure, etc.). To restrict the process' access to the object, the service may update the access permissions for the object that will be provided by its handle that the kernel will return to the process. The service may do so by calling a function(s) by which access permissions of kernel objects can be modified and specify the least privilege/restricted permissions that should be assigned to the object for subsequent access via its handle. On receipt of the handle for the object that is then returned by the kernel, the invoking process will be unable to manipulate the object for malicious purposes since the handle allows the process the least privilege/restricted permissions for accessing the object. As another example, the service may restrict the process' access to the object by blocking the access to the object and/or preventing the return of the handle, such as by blocking execution of the function invoked by the process that returns the handle for the object. Whether the service returns a handle for the object with reduced access permissions or prevents the return of the handle can vary among functions for which the callback function was registered such that the technique for restricting access to the object by the process is based on the function that was invoked by the process to attempt access to the object.

Figure 5:
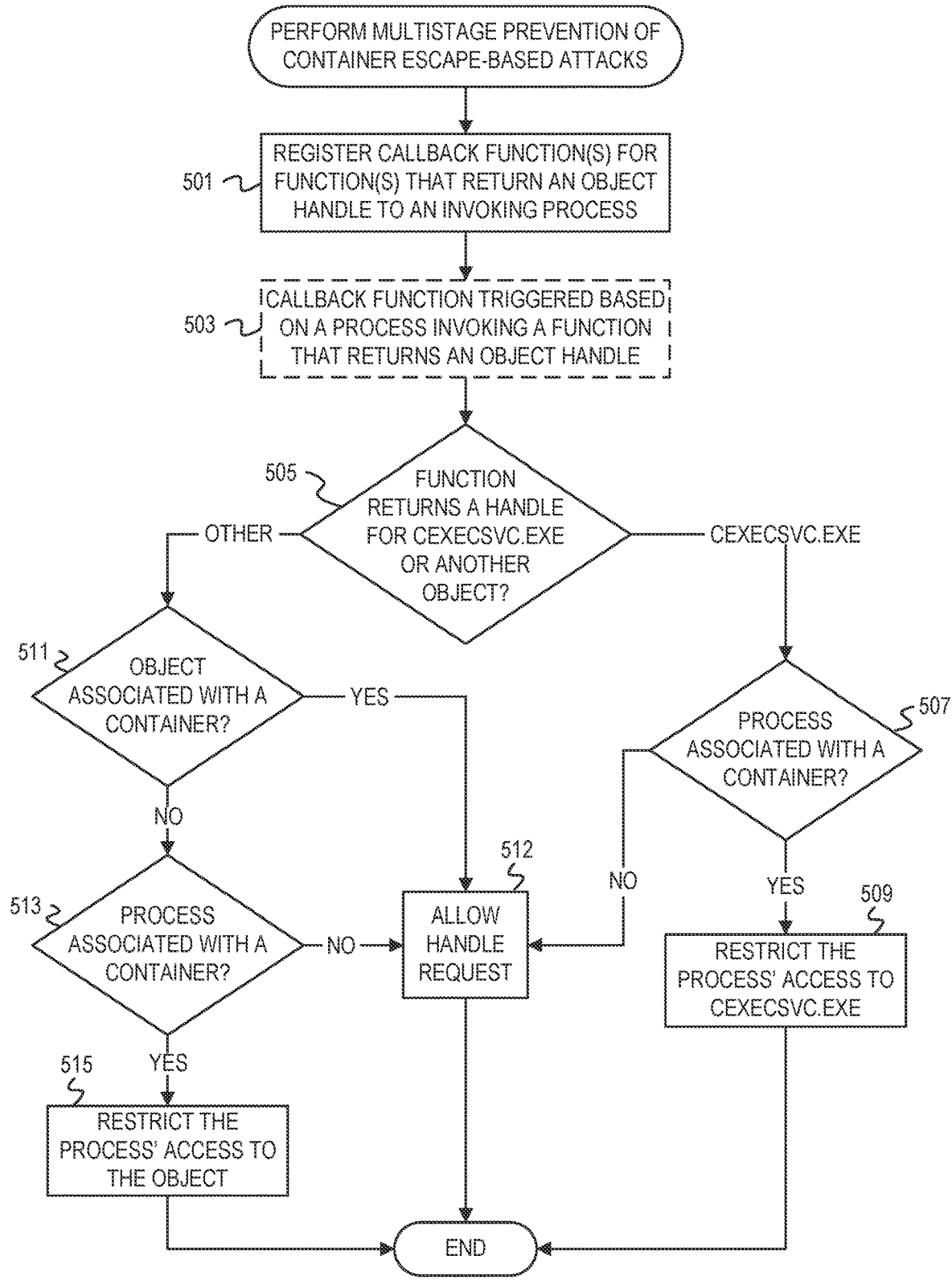
FIG. 5 is a flowchart of example operations for performing two-stage prevention of container escape-based attacks.

FIG. 5 is a flowchart of example operations for performing two-stage prevention of container escape-based attacks. While each of the stages are described individually in reference to FIGS. 3 and 4 to aid in understanding, in implementations, the kernel driver comprising the service may implement a single flow. Example operations for this flow that encompasses prevention of container escapes through illegitimate access to CExecSvc.exe and prevention of attacks carried out through container escapes through unknown means that evade detection are now described.

At block 501, the service registers at least a first callback function for one or more functions that return an object handle to an invoking process. The service implements a callback function that can execute on invocation of a function that returns a handle for an object to determine whether to return the handle based on evaluation of whether the process that invoked the function may be attempting illegitimate access of the host system through the object handle. Execution of the callback function is triggered at block 503 based on a process invoking a function specified as a condition for execution of the callback function.

At block 505, the service determines if the function that was invoked and triggered the callback function returns a handle for CExecSvc.exe or another object. The parameter value(s) provided by the process that invoked the function can inform the determination. For instance, if the function was invoked to obtain a handle for the instance of CExecSvc.exe of the host system, the process may have provided a process identifier associated with the instance of CExecSvc.exe as a parameter value for the function invocation. If the invoked function returns a handle for CExecSvc.exe and the process is thus attempting access to CExecSvc.exe, operations continue at block 507. If the invoked function returns a handle for another object (e.g., another file, process, or other kernel object), operations continue at block 511.

At block 507, the service determines if the requesting process is associated with a container. The service can determine whether the process attempting to access CExecSvc.exe is associated with a container as described above. If the process is associated with a container, operations continue at block 509, where the service restricts the process' access to CExecSvc.exe. The service may restrict the process' access to the instance of CExecSvc.exe by preventing return of a handle for CExecSvc.exe or by reducing access permissions to CExecSvc.exe that are provided via the handle that will be returned to the process. If the process is not associated with a container, operations continue at block 512, where the handle request for CExecSvc.exe is allowed.

At block 511, the service determines if the object indicated in the function invoked by the process is associated with a container. The service may determine if the object is under a root directory object that is different from the root directory object of the host system and the object is thus associated with a container. If the object is associated with a container, operations continue at block 512, where the handle for the object is returned to the process. Otherwise, if the object is not associated with a container, operations continue at block 513.

At block 513, the service determines if the process is associated with a container. The service can determine whether the process is associated with a container as described above (e.g., based on determining whether the process is associated with a silo object). If the process is associated with a container, operations continue at block 515. Otherwise, operations continue at block 512, where the handle request is allowed.

At block 515, the service restricts the process' access to the object. The service may restrict the process' access to the object by reducing access permissions to object that are provided via the object's handle that will be returned to the process. The process thus will obtain a handle for the object that does not afford the full set of access permissions and will be unable to manipulate the object to attack the host system. Another example of restricting the process' access to the object is preventing execution of the function invoked by the process that triggered the callback function or otherwise preventing fulfillment of the request for the access to the object (e.g., blocking return of a handle). Whether the service returns a handle for the object with reduced access permissions or prevents the return of the handle can vary among functions for which the callback function was registered such that the technique for restricting access to the object by the process is based on the function that was invoked by the process to attempt access to the object.

Figure 6:
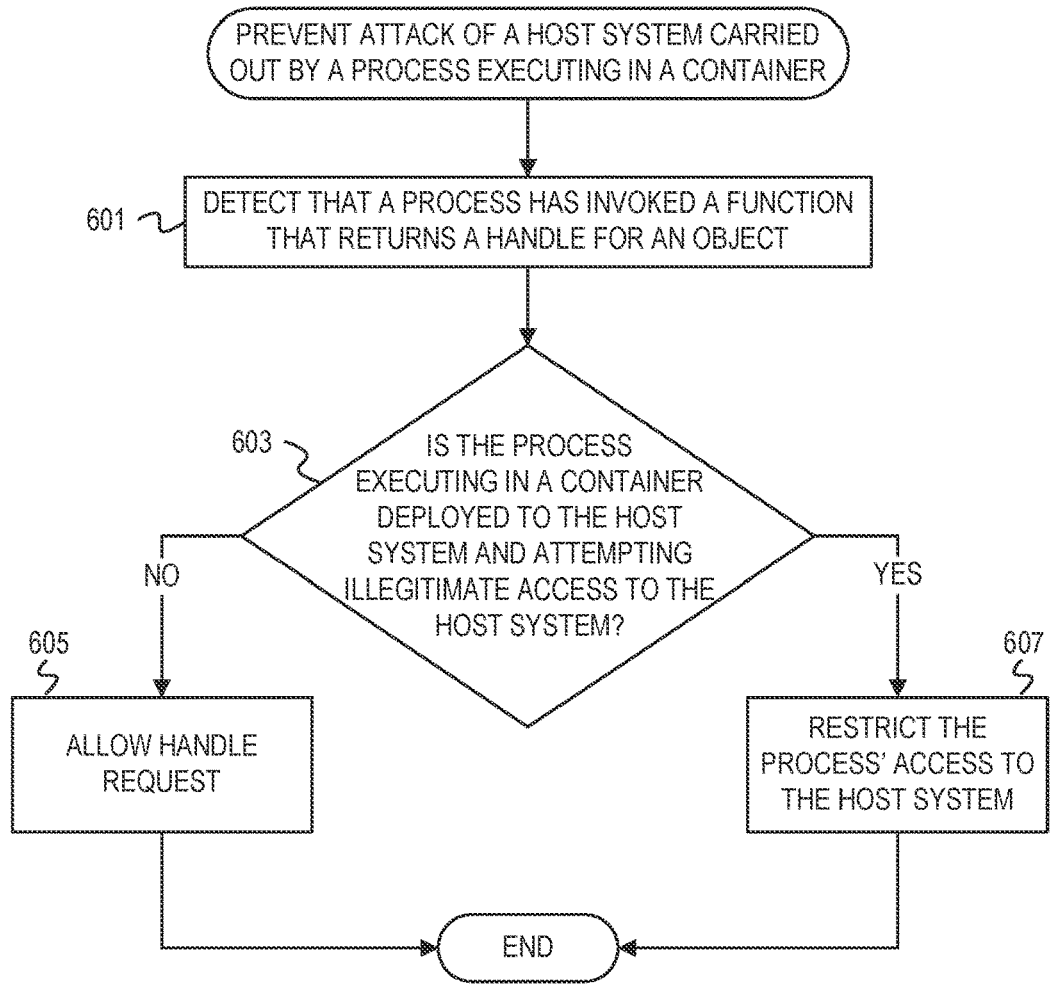
FIG. 6 is a flowchart of example operations for preventing an attack of a host system carried out by a process executing in a container.

FIG. 6 is a flowchart of example operations for preventing an attack of a host system carried out by a process executing in a container. At block 601, the service detects that a process has invoked a function that returns a handle for an object. Detection of the function invocation is based on the function invocation satisfying a condition for execution of a callback function such that the function invocation triggers the callback function.

At block 603, the service determines if the process is executing in a container deployed to the host system and is attempting illegitimate access to the host system. Illegitimate access to the host system can be access to an instance of CExecSvc.exe of the host system or another object of the host system that is attempted by a process associated with a container. The service can determine that the process is executing in a container and is attempting illegitimate access to the host system based on determining that the process is associated with a silo-implemented container (e.g., is a child of CExecSvc.exe itself) and has invoked a function that returns a handle for CExecSvc.exe. The service can also determine that the process is executing in a container and is attempting illegitimate access to the host system based on determining that the process is associated with a silo-implemented container and the object for which the handle is to be returned is associated with the host system rather than a container. If the process is executing in a container and attempting illegitimate access to the host system, operations continue at block 605, where the service allows the handle request. Otherwise, operations continue at block 607.

At block 607, the service restricts the process' access to the object. The service can restrict the process' access to the object by reducing access permissions that are allotted to the process for the object or otherwise blocking the access request. As a result, on return of the handle to the process, the process' access to the object via the returned handle can be restricted through reduction of access permissions that are allotted to the object via its handle.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 404 and 407 of FIG. 4 and/or blocks 511 and 513 of FIG. 5 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
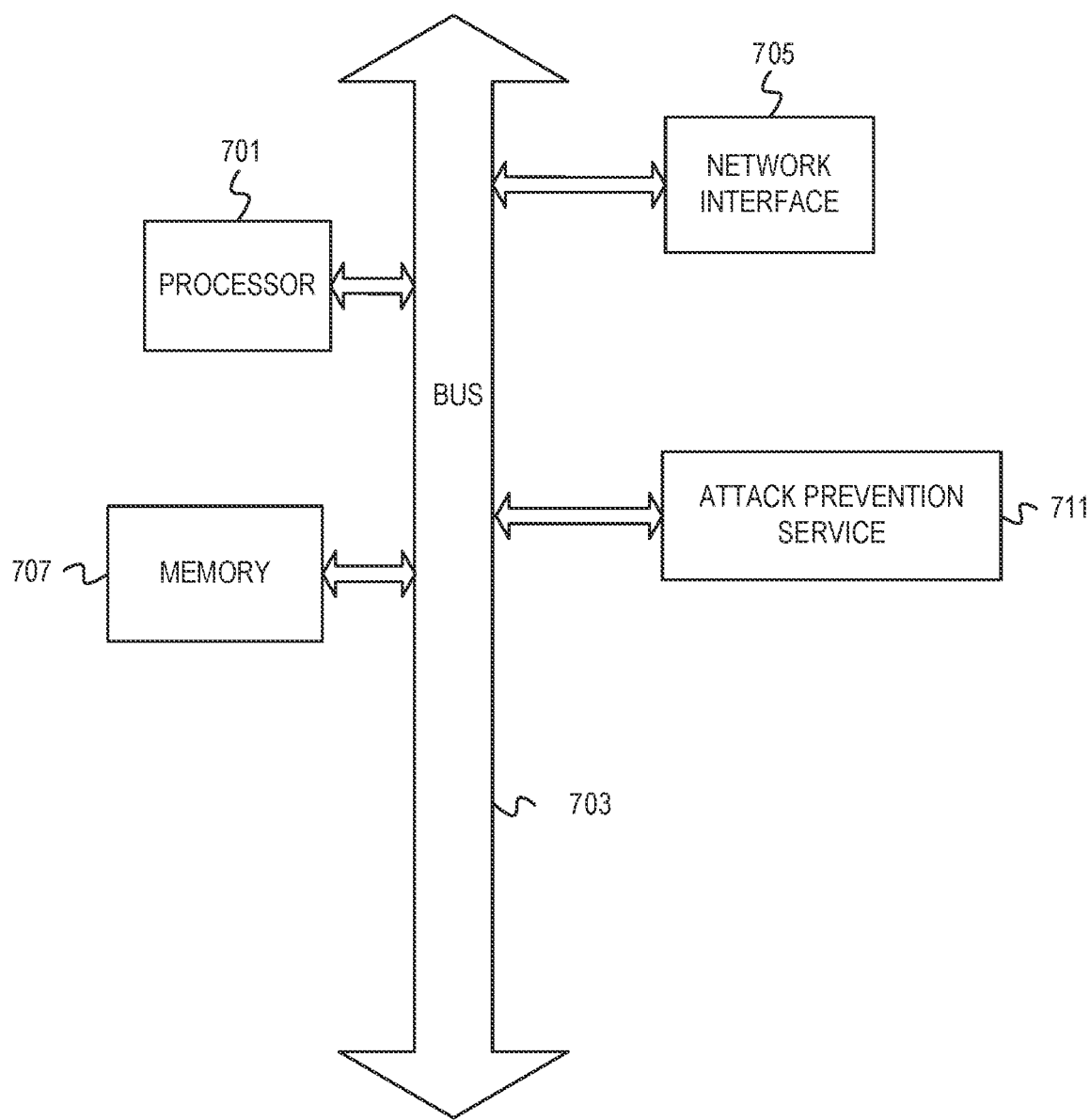
FIG. 7 depicts an example computer system with an attack prevention service.

FIG. 7 depicts an example computer system with an attack prevention service. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes attack prevention service 711. The attack prevention service 711 prevents processes that run in containers implemented with a silo object from escaping their container. The attack prevention service 711 also restricts access to the host system by processes that have escaped their containers with an unknown technique that evades detection to prevent attacks. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for preventing container escape-based attacks of a host system carried out through Windows containers implemented with silo objects as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:
   detecting that a process executing on a host system has invoked a first function that returns a handle for a first object;
   based on determining that the first object is an instance of CExecSvc.exe executing on the host system and the handle is for an instance of CExecSvc.exe, determining if the process is associated with a container and is attempting illegitimate access to the host system based, at least in part, on determining if the process is a child of CExecSvc.exe; and
   based on determining that the process is associated with a container and is attempting illegitimate access to the host system, restricting access to the host system by the process, wherein restricting access to the host system by the process comprises reducing access permissions for the instance of CExecSvc.exe and returning to the process the handle for the instance of CExecSvc.exe with reduced access permissions.

2. The method of claim 1, further comprising, based on determining that the first object is different from the instance of CExecSvc.exe, determining if the process is associated with a container and if the first object is also associated with a container, wherein determining if the first object is also associated with a container comprises determining if a root directory of the first object differs from a root directory of the host system.

3. The method of claim 2, wherein determining if the process is associated with a container comprises calling a function that returns an indication of whether the process is associated with a container.

4. The method of claim 2, further comprising, based on determining that the process is associated with a container and the first object is also associated with a container, allowing return of the handle for the first object.

5. The method of claim 1, further comprising registering a callback function for the first function, wherein detecting that the process has invoked the first function is based on invocation of the first function by the process triggering the callback function.

6. The method of claim 1, wherein the container is a container implemented with a silo kernel object.

7. The method of claim 1, wherein the first function comprises a function called to create a file, a function called to open an instance of a process, or a function called to create a process.

8. One or more non-transitory machine-readable media having program code stored thereon, the program code comprising instructions to:
   detect invocation of a first function that returns a handle for a first object by a process executing on a host system;
   based on a determination that the first object is an instance of CExecSvc.exe executing on the host system and the handle is for an instance of CExecSvc.exe, determine whether the process is associated with a container and is attempting illegitimate access to the host system based, at least in part, on a determination of whether the process is a child of CExecSvc.exe; and
   based on a determination that the process is associated with a container and is attempting illegitimate access to the host system, restrict access to the host system by the process, wherein the instructions to restrict access to the host system by the process comprise instructions to reduce access permissions for the instance of CExecSvc.exe and return to the process the handle for the instance of CExecSvc.exe with reduced access permissions.

9. The non-transitory machine-readable media of claim 8, wherein the program code further comprises instructions to, based on a determination that the first object is different from the instance of CExecSvc.exe, determine whether the process is associated with a container and whether the first object is also associated with a container, wherein the instructions to determine whether the first object is also associated with a container comprise instructions to determine whether a root directory of the first object differs from a root directory of the host system,
   based on a determination that the root directory of the first object is the same as the root directory of the host system, determine that the process is associated with a container but the first object is not also associated with a container.

10. The non-transitory machine-readable media of claim 9, wherein the instructions to determine whether the process is associated with a container comprise instructions to call a function that returns an indication of whether the process is associated with a container.

11. The non-transitory machine-readable media of claim 8, wherein the program code further comprises instructions to register a callback function for the first function, wherein invocation of the first function triggers the callback function.

12. An apparatus comprising:
a processor; and
a computer-readable medium having instructions stored thereon that are executable by the processor to cause the apparatus to,
  detect invocation of a first function that returns a handle for a first object by a process executing on a host system;
  based on a determination that the first object is an instance of CExecSvc.exe executing on the host system and the handle is for an instance of CExecSvc.exe, determine if the process is associated with a container and is attempting illegitimate access to the host system based, at least in part, on a determination of if the process is a child of CExecSvc.exe; and
  based on a determination that the process is associated with a container and is attempting illegitimate access to the host system, restrict access to the host system by the process, wherein the instructions to restrict access to the host system by the process comprise instructions to reduce access permissions for the instance of CExecSvc.exe and return to the process the handle for the instance of CExecSvc.exe with reduced access permissions.

13. The apparatus of claim 12, further comprising instructions executable by the processor to cause the apparatus to, based on a determination that the first object is different from the instance of CExecSvc.exe, determine if the process is associated with a container and if the first object is also associated with a container, wherein the instructions executable by the processor to cause the apparatus to determine if the first object is also associated with a container comprise instructions executable by the processor to cause the apparatus to determine if a root directory of the first object differs from a root directory of the host system.

14. The apparatus of claim 12, further comprising instructions executable by the processor to cause the apparatus to register a callback function for the first function, wherein invocation of the first function triggers the callback function, wherein the first function comprises a function called to create a file, a function called to open an instance of a process, or a function called to create a process.

15. The method of claim 2, further comprising, based on determining that the process is associated with a container but the first object is not also associated with a container, restricting access to the host system by the process, wherein restricting access to the host system by the process comprises preventing return of the handle to the process or reducing access permissions for the first object and returning to the process the handle for the first object with reduced access permissions.

16. The method of claim 15, wherein determining that the process is associated with a container but the first object is not also associated with a container comprises determining that the root directory of the first object is the same as the root directory of the host system.

17. The non-transitory machine-readable media of claim 9, wherein the program code further comprises instructions to restrict access to the host system by the process based on a determination that the process is associated with a container but the first object is not also associated with a container, wherein the instructions to restrict access to the host system by the process comprise instructions to prevent return of the handle to the process or instructions to reduce access permissions for the first object and return to the process the handle for the first object with reduced access permissions.

18. The apparatus of claim 13, further comprising instructions executable by the processor to cause the apparatus to, based on a determination that the process is associated with a container but the first object is not also associated with a container, restrict access to the host system by the process, wherein the instructions executable by the processor to cause the apparatus to restrict access to the host system by the process comprise instructions executable by the processor to cause the apparatus to prevent return of the handle to the process or instructions executable by the processor to cause the apparatus to reduce access permissions for the first object and return to the process the handle for the first object with reduced access permissions.

19. The apparatus of claim 18, wherein the instructions executable by the processor to cause the apparatus to determine that the process is associated with a container but the first object is not also associated with a container comprise instructions executable by the processor to cause the apparatus to determine that the root directory of the first object is the same as the root directory of the host system.

20. The apparatus of claim 13, wherein the instructions executable by the processor to cause the apparatus to determine if the process is associated with a container comprise instructions executable by the processor to cause the apparatus to call a function that returns an indication of whether the process is associated with a container.

* * * * *